United States Patent [19]

Schaefer et al.

[11] Patent Number: 4,731,769

[45] Date of Patent: Mar. 15, 1988

[54] CENTRAL SERVICING AND INFORMATION CONTROLLER FOR VEHICLE AUXILIARY EQUIPMENT

[75] Inventors: Peter Schaefer, Moensheim; Roland Ehniss, Karlsruhe; Dieter Marx, Kernen, all of Fed. Rep. of Germany

[73] Assignee: Dr. Ing. h.c.f. Porsche Akiengesellshaft, Stuttgart, Fed. Rep. of Germany

[21] Appl. No.: 851,568

[22] Filed: Apr. 14, 1986

[30] Foreign Application Priority Data

Apr. 20, 1985 [DE] Fed. Rep. of Germany ....... 3514438

[51] Int. Cl.[4] .................... H04B 1/20; G05D 23/00
[52] U.S. Cl. .................................. 369/6; 364/424; 455/345
[58] Field of Search ............... 369/6, 10; 364/424; 455/345

[56] References Cited

U.S. PATENT DOCUMENTS

| | | | |
|---|---|---|---|
| 3,821,489 | 6/1974 | Kocubej | 369/10 |
| 4,325,081 | 4/1982 | Abe et al. | 360/33.1 X |
| 4,435,648 | 3/1984 | Goode, III | 364/424 X |
| 4,435,845 | 3/1984 | Timm et al. | 455/345 X |
| 4,486,837 | 12/1984 | Kojima et al. | 364/424 |
| 4,516,207 | 5/1985 | Moriyama et al. | 364/424 |
| 4,519,003 | 5/1985 | Scholy | 360/33.1 X |
| 4,593,357 | 6/1986 | Van Ostrand et al. | 364/424 |
| 4,630,043 | 12/1986 | Haubner et al. | 364/424 X |
| 4,641,205 | 2/1987 | Beyers, Jr. | 360/33.1 |

FOREIGN PATENT DOCUMENTS 0122043 6/1984 European Pat. Off. .

OTHER PUBLICATIONS

"More Than a Car Radio Integration in Automobile Electronics"; Bauer-Funkshau-5/1982, pp. 53–55.
Elektronik; vol. 28, (1979, 9 Aug.), No. 16, pp. 31–36; "On Board Computer for Motor Vehicles", Ing et al.
"New Technologies Adopted in a Combined Compact Radio Equipment"; Hartlauer, 6/1979.
Electronics Week, Nov. 12, 1984, pp. 28–29; Weber, "GM tests Video Display in 1984 Production Car".
Nakamichi Mobile Sound System—TD-1200-/PA-300/SP-400, 2/1983.
SAE Technical Paper Series 850309, "A Concept of User–Guidance for Vehicle Information Systems", F. Heintz et al., International Congress & Exposition, Feb. 25–Mar. 1, 1985, pp. 115–122.
"Talking Keyboard for User Guidance in Multifunction Systems", G. Geiser et al., Presented at the 26th Annual Meeting of the Human Factors Society", Oct. 25–29, 1982, Seattle, Wash., USA, pp. 1–4.
"Method and Module for an Ergonomic and Economical Design of Man–Machine Dialogues", G. Nirschl et al., 4th European Annual Manual European Conf. on Human Decision Making . . . ", 1984.

Primary Examiner—Aristotelis M. Psitos
Attorney, Agent, or Firm—Barnes & Thornburg

[57] ABSTRACT

A central operating input and information output system for the control of a plurality of optional instruments in a vehicle has a display for displaying information and an option menu. A first control input controls the functions of the optional instruments and selects the option menu from a basic menu. The option menu indicates the functions of the optional instruments controllable by the first control input. The system has a second control input which controls at least one optional instrument and accesses at least one basic function of the system, irrespective of the option menu currently selected. This allows a central operating input and information output system to have a favorable ergonomic design, to be operated simply, and require a minimum of space. In addition, a high degree of safety is insured by the simplified controls, which minimizes the diversion of the driver from the traffic situation, while allowing him to obtain extensive information concerning the condition of the vehicle and the traffic situation.

29 Claims, 10 Drawing Figures

CENTRAL SERVICING AND INFORMATION CONTROLLER FOR VEHICLE AUXILIARY EQUIPMENT

BACKGROUND AND SUMMARY OF THE INVENTION

This invention relates to a central operating input and information system for the control of a plurality of optional instruments in a vehicle. The system has a display for displaying information and a plurality of option menus. A first control input controls the functions of the optional instruments, with an option menu indicating the functions of the instruments which can be controlled. A particular option menu can be selected from a basic menu which lists the option menus.

In motor vehicles, optional instruments and/or their controls are becoming increasingly installed in the area of the dashboard or central control panel. These optional instruments include, for example, radios, motor vehicle computers, and seat positioning control devices. These instruments improve both driving comfort and safety. However, the large number of instruments with their separate operating elements are difficult to house in a dashboard of a given size. As a result, the operating elements must be kept small which often results in a confusingly large number of operating buttons, keys and switches, often of similar or identical construction. It is therefore difficult for the driver of a motor vehicle to operate the correct operating element of the correct instrument without diverting his attention from the road and traffic.

In German published unexamined application, DE-OS No. 31 04 668, a multifunction operating part is shown that is directed to tempering the described problems. Several optional instruments are controlled by one operating device that has a numerical input, a functional-group switching means, operating elements and a display unit as well as an interface for an electronic unit. The operating elements, via the functional-group switching means, are assigned to a certain instrument. A disadvantage of this device is its insufficient ergonomic design, which was taken from computer technology. Because of this insufficient ergonomic design, too many requirements are placed on the average driver of a motor vehicle. In addition, the display has insufficient flexibility and there is a relatively poor assignment of the operating elements to the display.

An information system having a display which can be partitioned for displaying information and menus, is shown in "Autokatalog", (28th Year 1984/85, Date: Sept. 1, 1984, Vereinigte Motor-Verlage GmbH & CoKG, Stuttgart, Pages 264 and 265). This system is a straight transfer of the multifunctional operating and display systems already known from process computing technology [see, for example, Practical Control Engineering (1978, Volume 3, Pages 77-83,and 1980, Volume 9, Pages 302-309)]. It has control keys that are clearly assigned to the elements of shown menus. In this system, the elements indicate functions that can be operated by the corresponding control keys. The individual menus which each operate a certain optional instrument can be selected from a basic menu.

The above information system eliminates the disadvantages of the insufficient flexibility of the display and the poor assignment of the control elements to the display. However, its ergonomic design is still not optimal since all basic operating functions must be carried out via the menu. For the operation of important or frequently operated control elements, the corresponding instrument menu must be selected each time from the basic menu.

It is, therefore, an objective of the present invention to provide an arrangement for the central operating input and information output for optional instruments of vehicles that have a favorable ergonomic design, can be operated simply, and requires a minimum of space.

This and other objectives of the present invention are achieved by providing a second control input means for controlling at least one optional instrument and which can access at least one basic function of the central operating input and information output system, irrespective of the optional menu currently selected.

Certain advantages of the present invention arising from the provision of the second control input means are the favorable ergonomic design of the system, which can be operated simply, and requires a minimum of space. In addition, the present invention ensures a high degree of safety by its simplified controls, so as to minimize the diversion of the driver from the traffic situation, while allowing him to obtain extensive information concerning the condition of his vehicle and the traffic situation.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
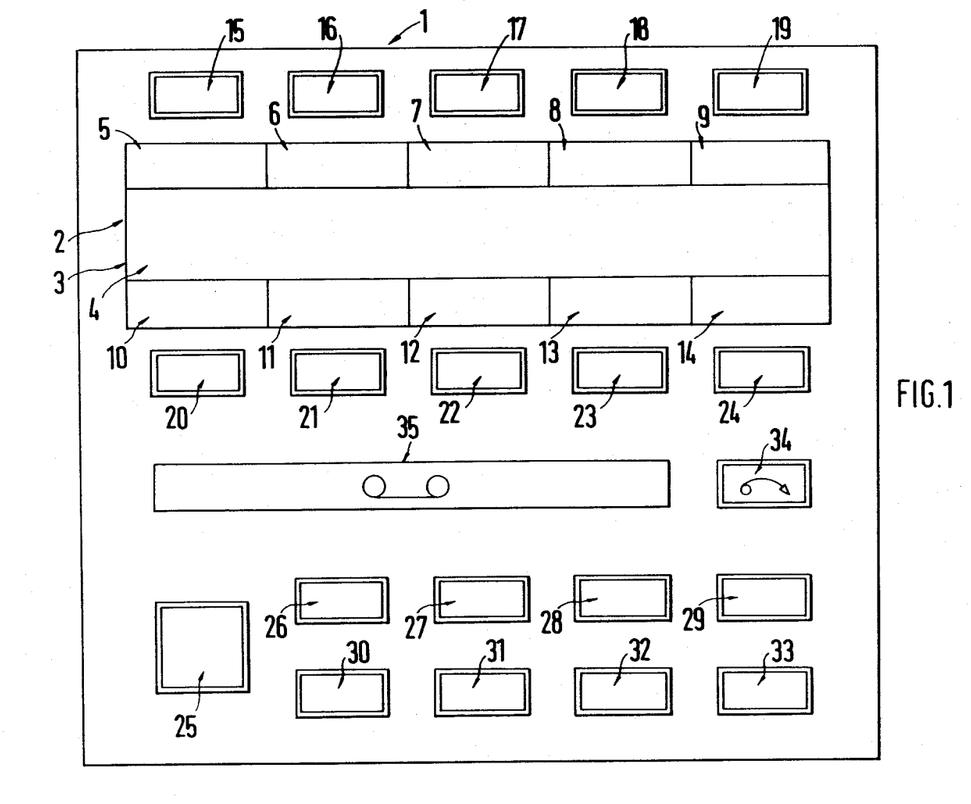
FIG. 1 is a front view of a central operating input and information output system constructed in accordance with a preferred embodiment of the present invention.

In FIG. 1, a central operating input and information output used for the control of several optional instruments installed in a vehicle has reference numeral 1. A display 2 of a display unit 3 is divided into a field 4 for the displaying of information, and into function selection tables, which are hereafter referred to as menu fields 5 to 14. In preferred embodiments, the display is either a Braun tube or a flat display.

Control keys 15 to 24 are clearly assigned to the menu fields 5 to 14 and the elements that are shown in them (not illustrated in FIG. 1). The elements indicate the functions that can be operated by means of the respective control keys 15 to 24.

The system also comprises additional control elements 25 to 34 that provide direct access to certain basic functions of the operating input and information output and the connected optional instruments.

By subdividing the menu fields 5 to 14 into ten individual fields and providing the additional control elements 25 to 34 for the basic functions, an ergonomically favorably designed system for the control of the functions of optional instruments is provided. These optional instruments can be, for example: a radio; a cassette system 35; a compact disk player; a vehicle computer; a diagnostic instrument; a positioning control instrument; a theft-prevention system; a service interval computer; a navigational instrument; a timing and time indicating instrument; a car telephone; a voice output unit; an air-conditioning control instrument; or a combination of these and/or other individual instruments.

The cassette system 35 or the compact disk player which may be contained in the system would, together with the adjacently arranged basic-function control element "cassette ejector 34", provide a good partitioning of the system. When a cassette or a compact disk is inserted or when the cassette or disk ejector 34 is pressed, there is an automatic switching from radio reception to a cassette or disk playback and vice versa.

Figure 2:
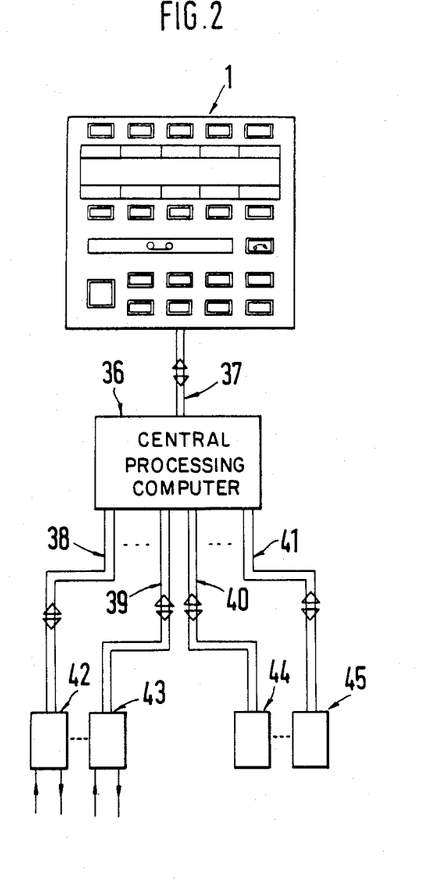
FIG. 2 is a partial, schematic, basic electrical circuit diagram of the embodiment of the system of FIG. 1.

In FIG. 2, a functional structure of the system is shown. Preferred embodiments of the central operating input and information output system 1 include a central control computer 36 with which the control keys 15 to 24 and control elements 25 to 34 and the display unit 3 are connected via input and output lines 37. Optional instruments 42 to 45 to be controlled are connected to the central control computer 36 by an instrument bus 38 to 41. In preferred embodiments, the instrument bus is designed as star-shaped, ring-shaped or spur-shaped.

The optional instruments or apparatuses 42 to 45 comprise apparatuses 42, 43 to which other subinstruments, such as sensors (not shown), are connected, or terminals 44, 45 that require no peripheral equipment. In preferred embodiments, some of these apparatuses 42 to 45 contain microcomputers. The apparatuses 42 to 45 can decode signals from the central control computer 36 and act on such decoded signals. In contemplated embodiments, the control computer 36 also takes over certain functions of the optional instruments 42 to 45, either completely or partially.

Examples of the operation of the operating input and information output will now be explained by means of FIGS. 3 to 6. In these Figures, and in FIG. 9, a possible distribution of the basic functions on the control elements 25 to 34 is also shown which is the same in each of the FIGS. 3 to 6 and 9.

By means of the differently designed key 25, a basic menu can be selected at any time. The basic menu displays and lists the option menus which can then be selected by the operator. When the basic menu is selected the individual instruments to be controlled or their menus can be selected by the control keys 15 to 24. The control element 26 switches the overall system and/or the radio on and off. In this embodiment, the control elements 27 and 28 are constructed as rocker keys and permit a shifting of an acoustic pattern in space in transverse 27 (balancing) and longitudinal directions 28 (fading).

An acoustic function can be selected by a control element 29. By means of the control elements 30 and 31, the volume of a sound reproduction can be adjusted. A received frequency can be changed by the control elements 32 and 33. In further contemplated embodiments, the basic function control elements are divided and arranged differently and/or comprise additional elements. For example, in contemplated embodiments, the volume or station adjustment are designed as turning knobs. Also provided in certain contemplated embodiments is a multiple assignment of individual control elements.

Figure 3:
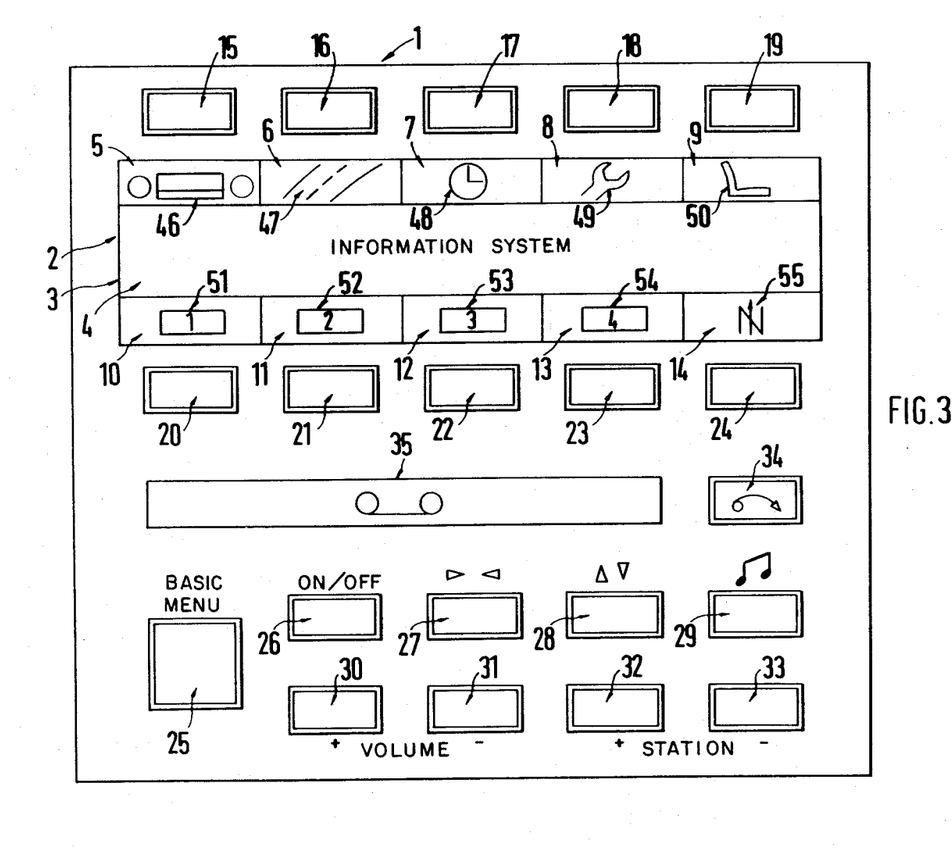
FIG. 3 is an example of a displayed basic menu of the embodiment of FIG. 1.

An example of a basic menu is shown on the display 2 in FIG. 2. The term "information system" appears in the information field 4. As shown, the menu fields are occupied by symbols for the equipment to be controlled as well as by characters. In the illustrated example, the following appears in the menu fields: 5 a radio symbol 46; 6 a driving data symbol 47; 7 a time symbol 48; 8 a control data symbol 51; 11 a second personal menu symbol 52; 12 a third personal menu symbol 53; 13 a fourth personal menu symbol 54; 14 a navigation symbol 55.

By operation of the pertaining control keys 15 to 24, a radio menu, a driving data menu, a time menu, an operating data menu, a positioning menu, a first to fourth personal menu and a navigation menu can be selected for the control of the corresponding optional apparatuses.

When the basic menu is displayed as in FIG. 3, and the control key 15 assigned to the radio symbol 46 is pressed, the radio menu is selected. With this selection, the word "radio", a selected station, a selected program, a pertaining received frequency as well as other symbols which, for example, designate a stereo reception or traffic radio, appear in the information field 4, as illustrated in FIG. 4.

In this embodiment, wave ranges can be selected by the control keys 15 and 16. A PCI (program comparison and identification) function, operated by control key 17, identifies transmitting stations and programs according to their momentarily best receiving frequencies.

Figure 4:
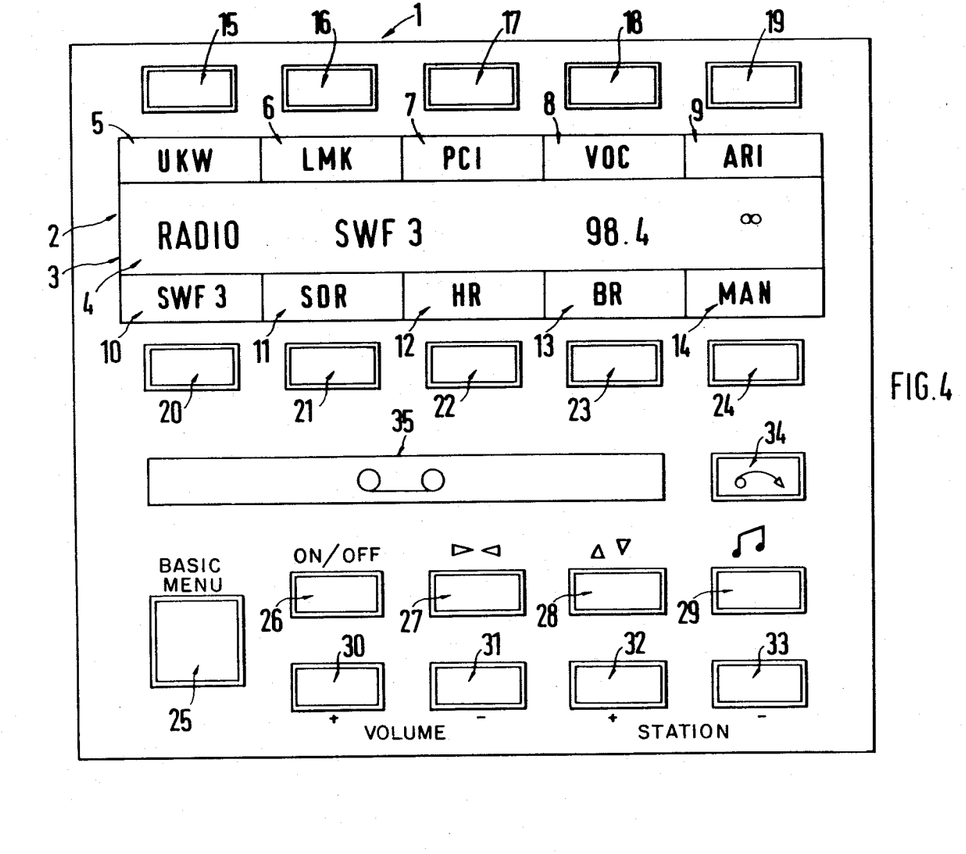
FIG. 4 is an example of a displayed radio menu of the embodiment of FIG. 1.

As shown in FIG. 4, the transmitting stations are indicated in the menu fields 10 to 13. The station that is most relevant for a traffic broadcast at the current location of the vehicle is located the farthest to the left in menu field 10. A station can be selected by a slight touching of one of the control keys 20 to 23. By a repeated slight touching, this program can be changed. When a station is changed, the last selected pertaining program is always tuned in. The control key 18 switches on and off a voice output unit (VOC) that announces the selected station and its program. By pressing the control key 19 (ARI), the reception of stations can be suppressed that have no traffic report broadcasts. Finally, by means of the control key 24, the radio receiver can be switched to manual tuning. The control keys 20 to 23 may then be used as station-selector keys.

Figure 5:
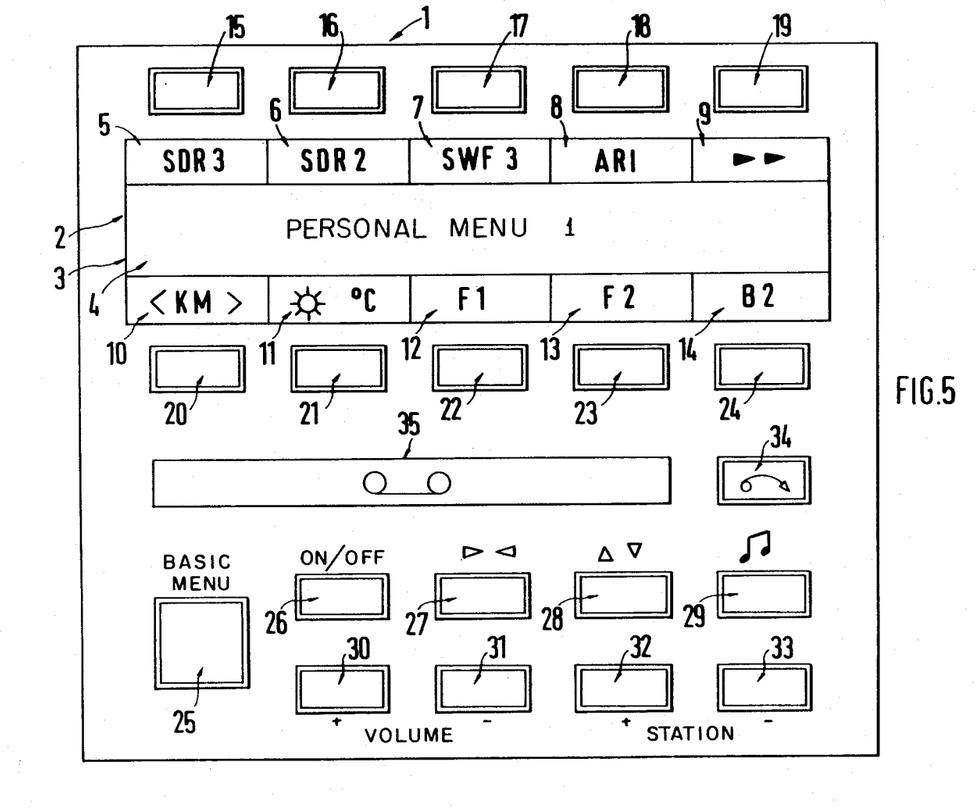
FIG. 5 is an example of a displayed personal menu of the embodiment of FIG. 1.

As another example, a first personal menu is shown in FIG. 5 that can be selected by the control key 20 from the basic menu. A personal menu of this type is set up by an operator individually from the elements of all menus. Thus, a single personal menu will contain only those equipment functions that are of special interest to the operator. Illustrated functions, for example, are (with the control key in parentheses) station programs "SDR 3" (15), "SDR 2" (16), "SWF 3" (17), the "ARI" function (18) of the radio, fast forward (19) of the cassette system (35), daily-mileage indicator (20), and the outside temperature (20) of the driving data computer, as well as positionings of a positioning control instrument, specifically, a driver side position "1" (22), a driver side position "2" (23), and a passenger side position "1" (24).

Figure 6:
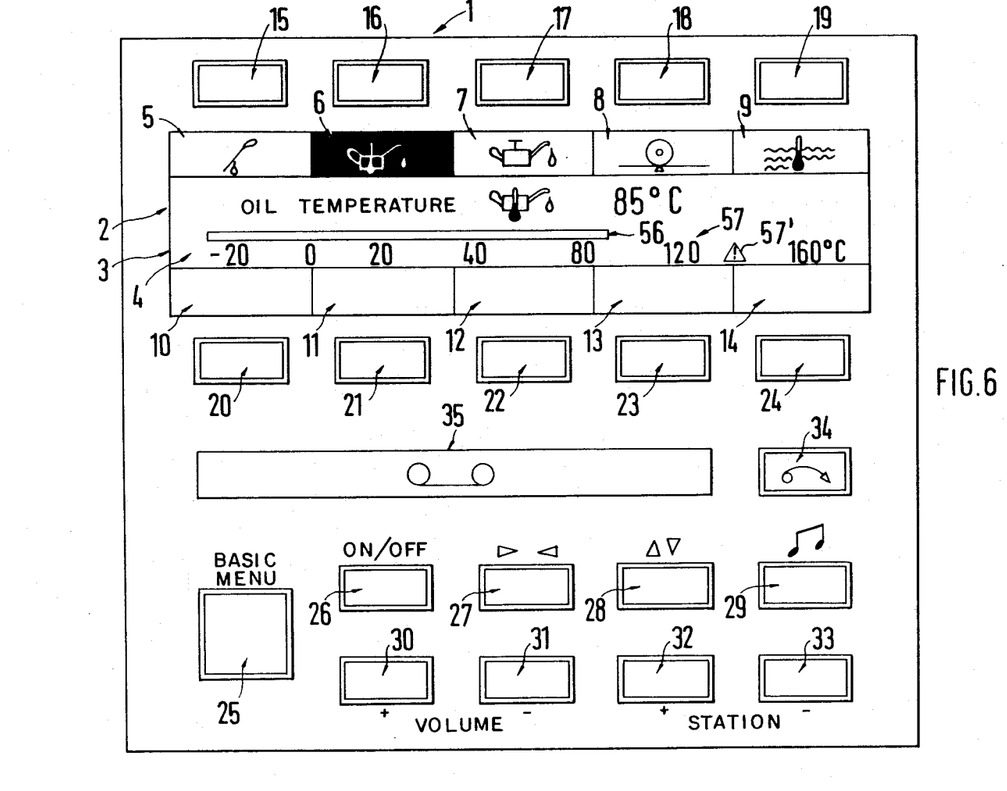
FIG. 6 is an example of a displayed operating data menu of the embodiment of FIG. 1.

In FIG. 6, an example of an operating data menu is shown which is selected by the control key 18 of the basic menu. The words "operating data" will first appear in the information field. After the selection of the oil temperature control key 16, for example, the words "oil temperature" will appear in the display 2 and/or a corresponding symbol and a measured value, such as 85° C. Other functions controlled by the control keys include, for example, oil level 15, oil pressure 17, tire pressure 18 and water pressure 19. In addition, in the illustrated embodiment, in the lower part of the information field, a quasi-analog display is also shown, which is in the form of a bar graph 56 above a scale 57 that is provided with a warning symbol 57'.

In addition, FIG. 6 illustrates an acknowledgement display activated after the keys are actuated. In the illustrated embodiment control key 16 was actuated. The corresponding menu field 6 in this example is shown in inverse light-dark contrast. Contemplated embodiments identify a menu field in other ways, such as framing or underlining, for example.

A further feature of a preferred embodiment provides that when a critical operating-data threshold value is exceeded, the display changes automatically to the operating data menu, displays the critical operating parameter and demonstrates it in a special way (blinking, etc.).

Figure 7:
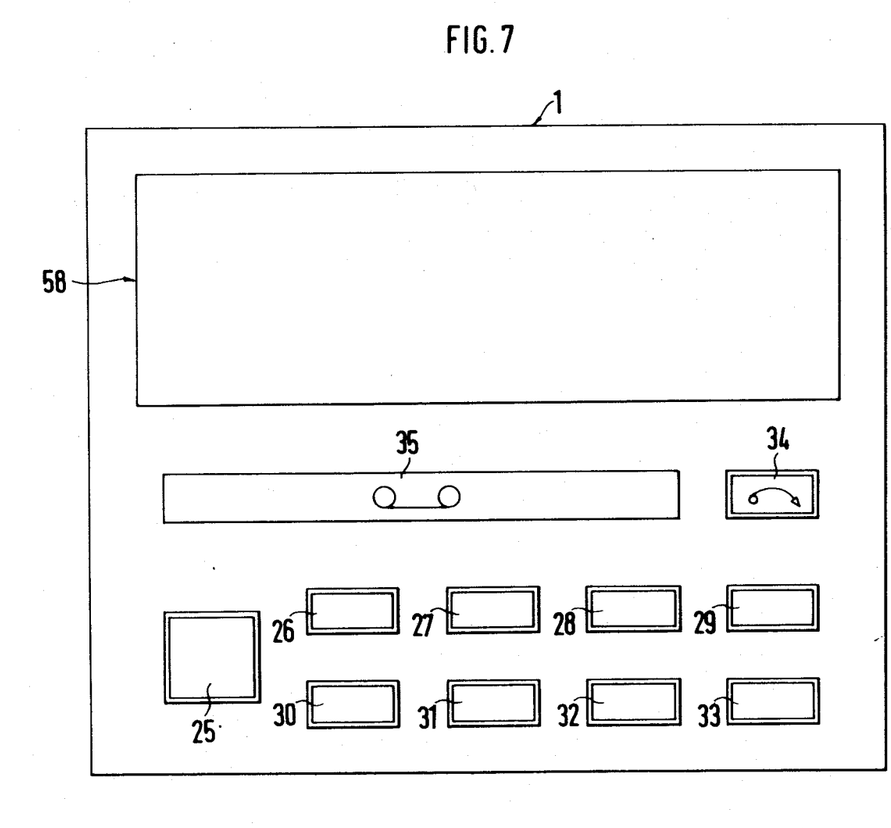
FIG. 7 is a front view of another preferred embodiment of a central operating input and information output constructed in accordance with the present invention.
Figure 8:
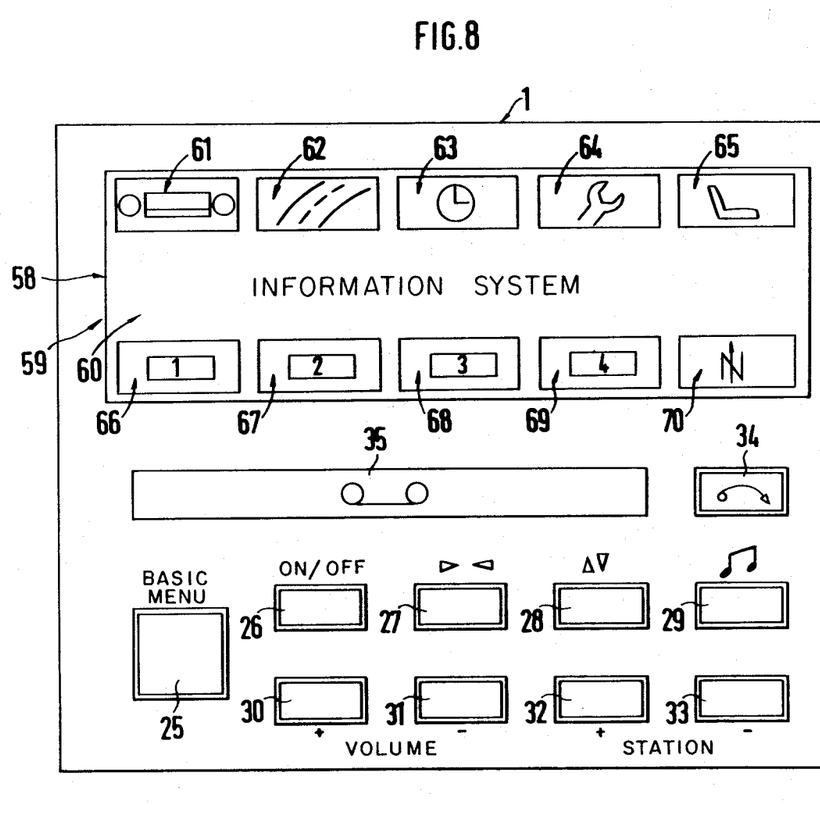
FIG. 8 is an example of a displayed basic menu shown on the display of the embodiment of FIG. 7.
Figure 9:
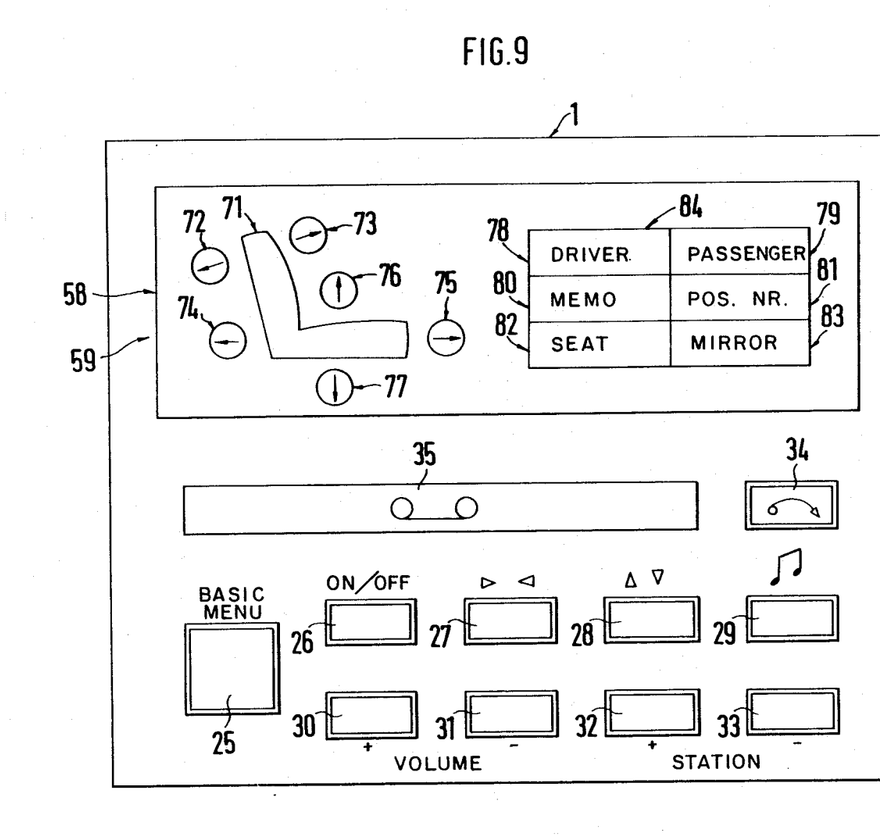
FIG. 9 is an example of a positioning menu shown on the display of the embodiment of FIG. 7.

A further embodiment of a central operating input and information output is shown in FIGS. 7 to 9 in which elements that are identical with those shown in the preceding figures have the same reference numbers.

This system has a touch-sensitive display screen 58 where a place of touch can be localized on its surface ("touch screen") so that the control keys can be shown individually on the screen as virtual touch keys or touch fields.

In FIG. 8, a basic menu is displayed. The display surface 59 of the display 58 is divided in the same way as the display 2 in FIG. 3. It is divided into an information field 60 and into menu fields 61 to 70 which, at the same time, serve as touch keys. The menu fields 61 to 70 have the same symbols as those 46 to 55 of the menu fields 5 to 14 of FIG. 3. The same words appear in the information field 60 so that a new description of the symbols and the method of operation is not necessary.

However, the touch-sensitive display 58 opens up extensive possibilities for this embodiment of the present invention. For example, an instrument to be controlled with its control functions can be "simulated" as a picture, i.e., can be represented symbolically. A menu that is structured in this way also has increased flexibility concerning the number of control keys. A return to customary control sequences can also take place in this embodiment.

An example of the operation of this embodiment will be explained by means of FIG. 9. A seat-positioning menu is shown having a pictured vehicle seat 71. Touch-sensitive control surfaces 72 to 77, separated into pictures and provided with direction-indicating arrows, are grouped around the shown vehicle seat in such a way that they indicate its adjusting possibilities: adjustment of the backrest inclining 72, 73; longitudinal adjustment 74, 75; and height adjustment 76, 77. The menu fields 78 to 83 in an additional control field 84 select: whether the driver's 78 or the passenger's seat 79 is to be adjusted; whether a position is to be stored 80; which seat positioning number 81 is to be started up, in which case the positioning number can be changed by a repeated slight touching; as well as whether the seats 82 or the inside and outside mirrors 83 are to be positioned. When the positioning menu is selected or the menu field 82 is touched, the picture of the vehicle seat—as shown—appears on the display, whereas, when menu field 83 is slightly touched, a mirror symbol is pictured that is not illustrated in FIG. 9.

A feature of a preferred embodiment of the central operating input and information output is a voice output system which, when a control key is actuated for an extended period of time, vocally explains its function, and/or triggers the function. The complete system can therefore be operated "blindly" so as to minimize the diversion of a driver from the traffic situation.

When the vehicle is equipped with a diagnostic system, contemplated embodiments provide that the display will show a defect that occurred in the vehicle and will also provide a suitable warning, such as a blinking display or voice output, for example.

Figure 10:
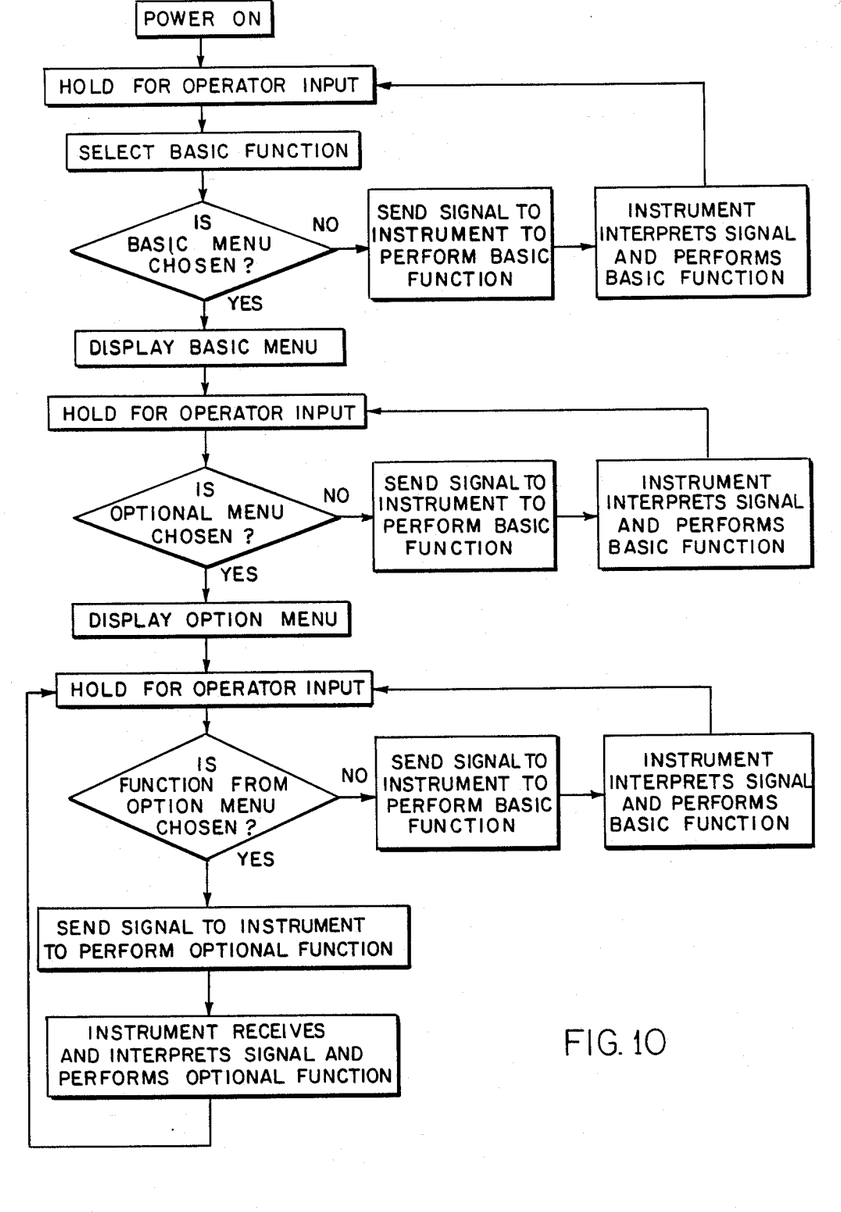
FIG. 10 is a basic flow chart illustrating a preferred embodiment of the operation of the present invention.

A basic flow chart illustrating a preferred embodiment of the operation of the system is shown in FIG. 10. The power for the system is first turned on. The system holds and waits for additional operator input. A basic function is selected by the operator. At any time during the sequence, if a basic function is input by the operator, the sequence is temporarily interrupted while a basic function subroutine is entered. After the basic function is performed, the sequence is returned to at the point of interruption.

If the basic menu is chosen, it is displayed. From this basic menu, the operator can choose from a number of optional menus. When an optional menu is chosen, it is displayed, showing the various functions optional instructions can perform. The operator chooses one of these functions which is then performed. The optional menu is still displayed, and the operator can choose from this optional menu, return to the basic menu, or choose another basic function.

At any time, a basic function may be chosen which will interrupt the sequence. If the basic menu is chosen, the optional menu will not be displayed any longer and the sequence does not return to the optional menu. Also, if the basic function "power on/off" which turns the system on and off is chosen, the sequence will not be returned to at the point of interruption, since the power has been turned off.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A central operating input and information output system for the control of a plurality of optional instruments in a vehicle, said instruments having basic functions such as volume control and defrosting, having display means partitionable into fields for displaying information and function-selection menus, and first control input means assigned to elements of displayed menus, said elements of said menus indicating functions that are controllable by said first control input means, with individual menus for controlling at least one optional instrument being selectable from at least one basic menu that is indicated in said display means, further comprising:

second control input means for directly controlling said basic functions of said central operation input and information output system and at least two said optional instruments at any time and irrespective of a menu that has been currently selected.

2. The system of claim 1, wherein the at least, two optional instruments comprises at least two of the following group:

a radio; a cassette system; a compact disk player; a vehicle computer; a diagnostic instrument; a positioning control instrument ; a theft prevention system; a service interval computer; a navigation instrument; a timing and time-indicating instrument; a car telephone; a voice output system; and an air-conditioning control device.

3. The system of claim 2, further comprising central control computer means for controlling the operation of the system.

4. The system of claim 3, wherein said central control computer means takes over at least one function of at least one of said group of optional instruments.

5. The system of claim 3, wherein the at least one basic function comprises at least one of the following basic function group:

a system on/off; a basic menu; a volume; a station adjustment; a cassette ejection; a compact disk ejection; an acoustic function; a balancing; a fading; a muting; and a defrosting.

6. The system of claim 2, wherein the at least one option menu includes at least one of the following group:

a radio menu; a compact cassette menu; a compact disk menu; a driving data menu; an operating data menu; a diagnostic menu; a theft-prevention menu; a positioning menu; an air-conditioning menu; a navigation menu; a time menu; and a telephone menu.

7. The system of claim 6, wherein a plurality of optional menus of said group are selectable from said basic menus, and wherein the at least one optional menu is a personal menu which is compiled from the functions of said group of optional menus.

8. The system of claim 6, wherein when the at least one optional menu includes said compact disk menu and said radio menu, said system further comprises switching means for automatically switching a displayed menu to said compact disk menu and causing said compact disk to be played back when a compact disk is inserted.

9. The system of claim 8, wherein said switching means switches the system back to radio reception when said compact disk is ejected.

10. The system of claim 6, wherein when the at least one optional menu includes cassette menu and said radio menu, said system further comprises switching means for automatically switching a displayed menu to said cassette menu and for causing the cassette to be played back when said cassette is inserted.

11. The system of claim 10, wherein said switching means switches said system to radio reception when said cassette is ejected.

12. The system of claim 2, wherein when said at least one optional menu is said radio menu, said radio includes a traffic radio decoder with range and report identification and with receiver means and determination means for determining which frequency of a station can best be received, and first storage means for automatically storing stations and programs in an area being driven through, including the currently best receiving frequencies and traffic report identifications, said storage taking place when said system is turned on, said storage being revised according to the location of the vehicle, and wherein said stations are displayed in the radio menu.

13. The system of claim 12, wherein a station most appropriate for traffic reports in the area through which the vehicle is driving is displayed the farthest to the left in the radio menu.

14. The system of claim 13, wherein at least one individual program of an indicated station is selected by a slight touching of a pertaining first control input means.

15. The system of claim 14, further including second storage means for storing a last-selected program of a station when said station is changed.

16. The system of claim 1, wherein the first control input means are keys assigned to elements of a displayed option menu, and said elements correspond to said functions of the optional instruments.

17. The system of claim 16, further comprising acknowledgement means for acknowledging in the display when one of said control keys is actuated.

18. The system of claim 17, wherein said acknowledgement means is a pertaining menu field displayed in inverse light-dark contrast.

19. The system of claim 18, further comprising triggering means for triggering the function pertaining to an actuated control key, said control key being actuated by a slight touching; and for triggering a voice output system to explain the function pertaining to said control key when said control key is touched for a longer period of time.

20. The system of claim 16, wherein said control keys are touch keys on a display surface of a touch-sensitive display.

21. The system of claim 20, further comprising acknowledgement means for acknowledging in the display when one of said touch keys is actuated.

22. The system of claim 21, wherein said acknowledgement means is a pertaining menu field displayed in inverse light-dark contrast.

23. The system of claim 22, further comprising triggering means for triggering the function pertaining to an actuacted control key, said control key being actuated by a slight touching; and for triggering a voice output system to explain the function pertaining to said control key when said control key is touched for a longer period of time.

24. The system of claim 23, wherein ten said option menus are displayed in said display means and said first control input means includes ten control keys.

25. The system of claim 16, wherein said control keys are arranged above and below the display.

26. The system of claim 1, wherein said at least one optional menu is displayed pictorially such that it simulates a corresponding optional instrument and its control functions.

27. The system of claim 1, further comprising warning means for displaying alpha-numerically a warning in said display when a defect in a vehicle component is determined by a diagnostic instrument.

28. The system of claim 1, wherein said display is at least one of a Braun tube and a flat display.

29. An apparatus for use with a central operating input and information output system for the control of a plurality of optional instruments in a vehicle, said instruments having basic functions such as volume control and defrosting, having display means partitionable into fields for displaying information and function-selection menus, and first control input means assigned to elements of displayed menus, said elements of said menus indicating functions that are controllable by said first control input means, with individual menus for controlling at least one optional instrument being selectable from at least one basic menu that is indicated in said display means, further comprising:

second control input means for directly controlling said basic functions of said central operation input and information output system and at least two said optional instruments at any time and irrespective of a menu that has been currently selected.

* * * * *